US012586459B2

(12) United States Patent
Austin et al.

(10) Patent No.: US 12,586,459 B2
(45) Date of Patent: Mar. 24, 2026

(54) ILLUMINATING A ROAD CROSSING TO INDICATE A SAFE CROSSING CONDITION FOR A USER

(71) Applicant: Toyota Motor Engineering & Manufacturing North America, Inc., Plano, TX (US)

(72) Inventors: Benjamin Piya Austin, Saline, MI (US); Rohit Gupta, Santa Clara, CA (US); William Patrick Garrett, Plymouth, MI (US); Rebecca L Kirschweng, Bloomfield Hills, MI (US); Philip J Babian, Canton, MI (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 162 days.

(21) Appl. No.: 18/416,036

(22) Filed: Jan. 18, 2024

(65) Prior Publication Data

US 2025/0239151 A1     Jul. 24, 2025

(51) Int. Cl.
| | |
|---|---|
| *G08G 1/005* | (2006.01) |
| *B60W 40/09* | (2012.01) |
| *B60W 40/105* | (2012.01) |
| *E01F 9/582* | (2016.01) |
| *G06V 40/10* | (2022.01) |

(52) U.S. Cl.
CPC ............. *G08G 1/005* (2013.01); *B60W 40/09* (2013.01); *B60W 40/105* (2013.01); *E01F*

9/582 (2016.02); *G06V 40/103* (2022.01); *B60W 2540/22* (2013.01)

(58) Field of Classification Search
CPC .... G08G 1/005; B60W 40/09; B60W 40/105; B60W 2540/22; E01F 9/582; G06V 40/103
See application file for complete search history.

(56) References Cited

U.S. PATENT DOCUMENTS

| | | | |
|---|---|---|---|
| 10,358,083 B2 * | 7/2019 | Suzuki .................... | B60Q 1/04 |
| 11,084,494 B2 | 8/2021 | Hu et al. | |

(Continued)

FOREIGN PATENT DOCUMENTS

| | | |
|---|---|---|
| AU | 2010201018 A1 | 10/2010 |
| KR | 101871055 B1 | 5/2018 |

(Continued)

*Primary Examiner* — Mohamed Barakat
(74) *Attorney, Agent, or Firm* — Christopher G. Darrow; Darrow Mustafa PC

(57) ABSTRACT

System, methods, and other embodiments described herein relate to improving the safety of pedestrians at a road crossing. In one embodiment, a method includes acquiring sensor data about a pedestrian and a vehicle in surroundings of a road crossing. The method further includes identifying an intention to cross the road crossing of the pedestrian and a driving behavior of the vehicle. The method additionally includes determining a safety condition for the pedestrian to cross the road crossing based, at least in part, on the driving behavior. Moreover, the method includes controlling at least one lighting mechanism of the road crossing according to the safety condition.

20 Claims, 3 Drawing Sheets

(56) References Cited

U.S. PATENT DOCUMENTS

| 11,721,210 | B2 * | 8/2023 | Kim | G08G 1/095 |
| | | | | 340/907 |
| 11,830,357 | B1 * | 11/2023 | Murphy | G08G 1/0145 |
| 2009/0146841 | A1 * | 6/2009 | Basson | G08G 1/005 |
| | | | | 340/925 |
| 2016/0061625 | A1 * | 3/2016 | Wang | G01C 21/3697 |
| | | | | 701/454 |
| 2017/0038018 | A1 * | 2/2017 | Johnson | F21V 21/14 |
| 2020/0242922 | A1 | 7/2020 | Dulberg et al. | |
| 2021/0053569 | A1 | 2/2021 | Censi et al. | |
| 2022/0111865 | A1 | 4/2022 | Lawrence et al. | |
| 2022/0172626 | A1 * | 6/2022 | Baik | G06V 40/103 |

FOREIGN PATENT DOCUMENTS

| KR | 20180047899 | A | 5/2018 |
| KR | 102015022 | B1 | 10/2019 |
| KR | 102329778 | B1 | 11/2021 |
| KR | 102330579 | B1 | 12/2021 |

* cited by examiner

ILLUMINATING A ROAD CROSSING TO INDICATE A SAFE CROSSING CONDITION FOR A USER

TECHNICAL FIELD

The subject matter described herein relates, in general, to improving the safety of a pedestrian at a road crossing, and, more particularly, to using a lighting mechanism associated with the road crossing to indicate a safe crossing condition.

BACKGROUND

Pedestrians must judge when it is safe to cross a roadway in the presence of approaching traffic. Approaches for indicating that it is safe for a pedestrian to cross a roadway may include the implementation of pedestrian crosswalk signs and audible signals. However, many crosswalks are non-signalized, leaving the judgment of whether it is safe to cross with the pedestrian. Further, even in areas with crosswalk signals, pedestrians with general cognitive impairments or poor eyesight may have difficulty judging the speed and distance of approaching traffic, following the crosswalk signals appropriately, and/or crossing the crosswalk safely (e.g., without deviating from the proper path). Moreover, some drivers do not respect pedestrian right-of-ways and traffic signals, which leaves pedestrians who follow cross-walk signals potentially vulnerable. Accordingly, the current methods do not provide an indication for pedestrians that it is safe to cross a street while considering the behavior of surrounding vehicles. Further, the current methods do not provide a crosswalk that is easily discernible for all pedestrians.

SUMMARY

Example systems and methods relate to a manner of communicating when it is safe for a pedestrian to cross a roadway. As previously discussed, it may be difficult for pedestrians to judge when it is safe to cross a street at non-signalized crosswalks. Further, for pedestrians with poor eyesight and/or cognitive impairments, crosswalk signals may not be readily discernible. Moreover, current methods fail to provide an indication that it is safe to cross in light of the driving behavior associated with approaching traffic.

Therefore, in one embodiment, a system that improves communicating about when it is safe for a pedestrian to cross a road is disclosed. The system can be implemented in different forms, such as within infrastructure near locations where pedestrians may cross a roadway. The system is generally configured to acquire information about agents within the environment in order to assess safety for crossing the street. For example, the system can acquire information about a pedestrian and also driving behaviors of a driver. Information about the pedestrian can include the speed, gait, location, and position of the pedestrian, and information about driving behaviors of the driver can include a driving history and/or a real-time condition of the vehicle. The driving history may include safety related characteristics of the driver, such as whether the driver tends to yield to pedestrians, tends to slow down when pedestrians are nearby, and tends to respect yellow and red light signals. The real-time condition includes, for example, the speed, acceleration, and state of autonomy of the vehicle. By analyzing and processing this information, the system can determine whether it is safe for the pedestrian to cross the street.

As one example, the system may determine that it is safe when the driving history of the driver reflects that the driver is likely to allow the pedestrian to safely cross the street. Additionally, the system can determine that it is safe for the pedestrian to cross if the pedestrian is moving in a manner that would allow the pedestrian to reach the other side of the street before the vehicle crosses paths with the pedestrian. Thus, the system may consider various factors about the pedestrian and the vehicle to assess the safety. In any case, when the system determines that it is safe for the pedestrian to cross the street, the system communicates a safe crossing condition to the pedestrian using a lighting mechanism that may take various forms depending on the implementation. For example, the lighting mechanism may be embedded into a crosswalk or projected from a light post onto a crossing. Activation of the lighting mechanism may vary depending on the determinations to output a bright, colorful light that notifies the pedestrian of the safe condition. On the other hand, when the system determines that it is not safe for the pedestrian to cross, the system controls the lighting mechanism to convey an unsafe condition by, for example, deactivating the lighting mechanism or by varying the lighting mechanism in some manner (e.g., by changing the color, flash pattern, brightness, etc.). In this way, the system improves communicating when it is safe for a pedestrian to cross a street.

In one embodiment, a system is disclosed. The system includes one or more processors and a memory communicably coupled to the one or more processors. The memory storing instructions that, when executed by the one or more processors, cause the one or more processors to acquire sensor data about a pedestrian and a vehicle in surroundings of a road crossing. The instructions further include instructions to identify an intention to cross the road crossing of the pedestrian and a driving behavior of the vehicle. The instructions additionally include instructions to determine a safety condition for the pedestrian to cross the road crossing based, at least in part, on the driving behavior. Moreover, the instructions include instructions to control at least one lighting mechanism of the road crossing according to the safety condition.

In one embodiment, a non-transitory computer-readable medium and including instructions that when executed by one or more processors cause the one or more processors to perform one or more functions is disclosed. The instructions include instructions to acquire sensor data about a pedestrian and a vehicle in surroundings of a road crossing. The instructions further include instructions to identify an intention to cross the road crossing of the pedestrian and a driving behavior of the vehicle. The instructions additionally include instructions to determine a safety condition for the pedestrian to cross the road crossing based, at least in part, on the driving behavior. Moreover, the instructions include instructions to control at least one lighting mechanism of the road crossing according to the safety condition.

In one embodiment, a method is disclosed. In one embodiment, the method includes acquiring sensor data about a pedestrian and a vehicle in surroundings of a road crossing. The method further includes identifying an intention to cross the road crossing of the pedestrian and a driving behavior of the vehicle. The method additionally includes determining a safety condition for the pedestrian to cross the road crossing based, at least in part, on the driving behavior. Moreover, the method includes controlling at least one lighting mechanism of the road crossing according to the safety condition.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
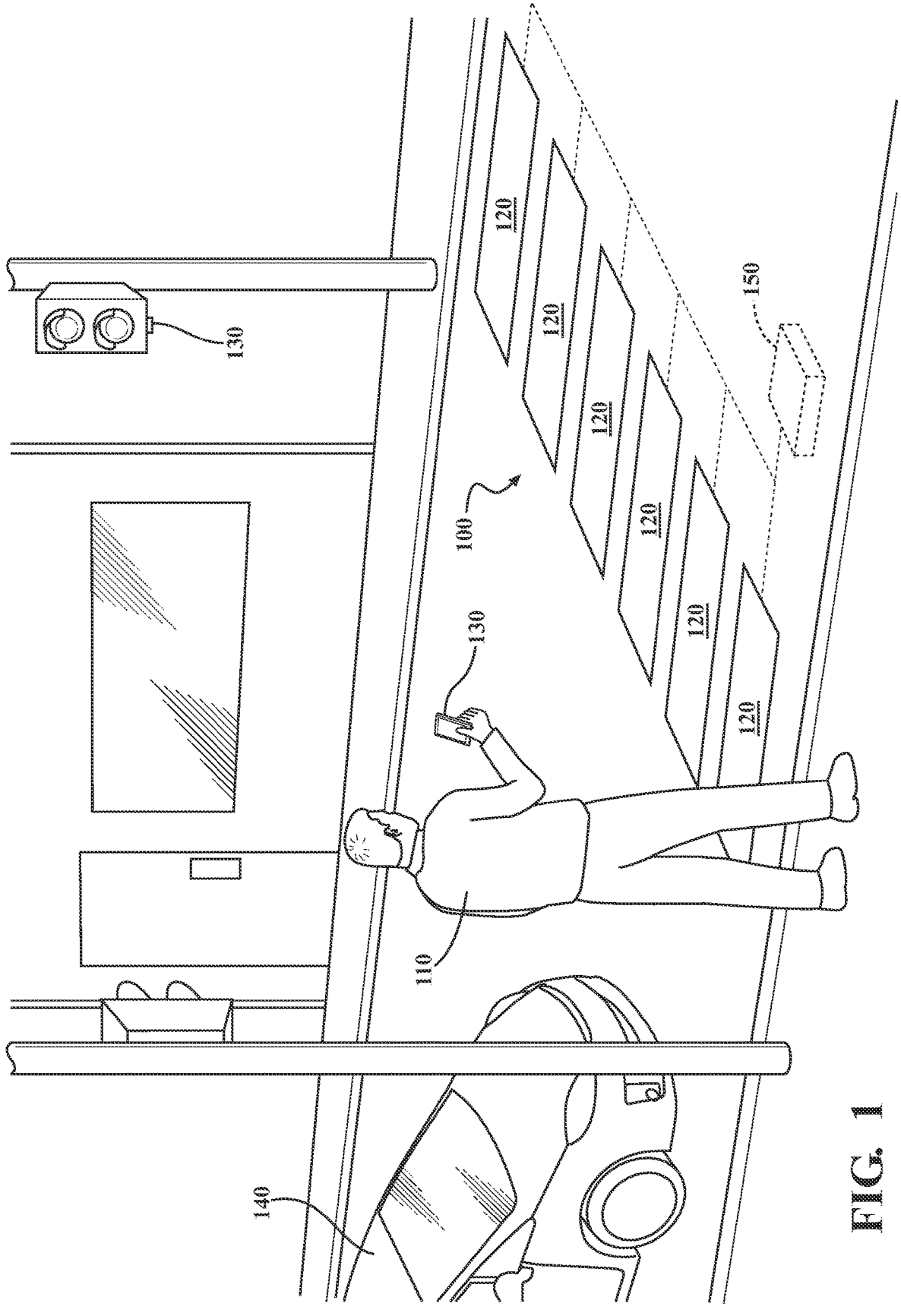
FIG. 1 illustrates one embodiment of a road crossing within which systems and methods disclosed herein may be implemented.

Systems, methods, and other embodiments associated with improving the safety of a pedestrian at a road crossing are disclosed herein. As previously discussed, it can be difficult for pedestrians to judge when crossing a road crossing is safe due to a lack of pedestrian-based signals and/or because it may be difficult for pedestrians to discern the speed and behavior of approaching traffic. If a pedestrian misjudges a vehicle's intention, unsafe road conditions, such as a collision, erratic driving behavior, angered drivers, and traffic delays can arise. Therefore, in one embodiment, a system that improves the safety of pedestrians at a road crossing using a lighting mechanism is disclosed.

In one aspect, the system is implemented in different forms, such as within infrastructure near locations where pedestrians may cross a roadway. For example, the system may be implemented near a crosswalk. The system is generally configured to acquire information about agents within the environment in order to assess safety for crossing the street. Agents include, for example, pedestrians and drivers of approaching vehicles. Information about the pedestrian can include the speed, gait, location, and position of the pedestrian. Using the acquired pedestrian information, the system can determine whether the pedestrian intends on entering a crosswalk or crossing a road crossing. For example, if the pedestrian is walking towards a crosswalk, standing at and facing a crosswalk, or directly across the street from a frequently visited location or destination, the system may determine that the pedestrian intends on entering the crosswalk/crossing a road crossing. On the other hand, if the pedestrian is merely standing near a crosswalk but facing away from the crosswalk, on the same side of the street as a destination of the pedestrian, etc., then the system may determine that the pedestrian does not intend on crossing the street. When the information indicates that the pedestrian does intend on crossing a road crossing, the system then further processes information to determine whether it is safe for the pedestrian to cross based, at least in part, on the driving behavior of approaching traffic.

To determine whether it is safe for the pedestrian to cross the road crossing, the system further analyzes the driving behavior of an approaching vehicle, which can include a driving history and/or a real-time condition of the vehicle. The driving history may include safety related characteristics of the driver, such as whether the driver has a history of yielding to other road users and/or a history of following instructions output from infrastructure. For example, the driving history may include information about whether a driver respects redlights and stop signs and whether the driver tends to slow down and allow pedestrians to cross the street when pedestrians are present near the driver. The real-time condition of the vehicle can include an operating condition of the vehicle, an environment of the vehicle, a speed of the vehicle, an acceleration of the vehicle, an emotional state of the driver, and a level of autonomy currently used by the vehicle. For example, the real-time condition may reflect that the vehicle is rapidly approaching a crosswalk, that the vehicle's brakes are in poor working condition, and that the driver is in an agitated state of mind. In any case, the system can use the driving history and real-time condition of the vehicle to classify the overall driving behavior of the vehicle. For example, the system may classify the driving behavior as unsafe, safe, etc. thereby influencing whether crossing is safe for the pedestrian, Further, the system, in one arrangement, uses the driving behavior to determine whether it is safe for a pedestrian to cross a road crossing. The system can determine that it is safe to cross when the driving behavior reflects a likelihood that the vehicle will stop before reaching the road crossing. For example, if the driver has a tendency to stop at road crossings for pedestrians and to respect a pedestrian yield sign, then the system determines the pedestrian can cross the road crossing safely. The system can further analyze the movement profile of the pedestrian to determine whether the pedestrian can safely cross the road crossing. The movement profile may include a speed and gait of the pedestrian. As an example, if the pedestrian movement profile indicates the path of the pedestrian and the path of an approaching vehicle are not intersecting, then the system determines it is safe for the pedestrian to cross the road crossing.

Accordingly, responsive to determining crossing is safe for the pedestrian, the system communicates the identified safety condition to the pedestrian using a lighting mechanism that may take various forms depending on the implementation. For example, the lighting mechanism may be embedded into a crosswalk or implemented within a nearby device (e.g., a pedestrian device and/or infrastructure, such as a stoplight, billboard, and so on) to project light onto a crossing. Activating the lighting mechanism may vary depending on the determinations. For example, the system can vary the lighting by adjusting the color, brightness, and flash patterns of the lighting mechanism. The system may control a light that conveys the safety condition to activate when it is safe for the pedestrian to cross the road crossing. As an example, the system can control the lighting mechanism to output a light signaling to the pedestrian, such as a bright, colorful light that notifies the pedestrian of the safe condition. On the other hand, when the system determines that it is not safe for the pedestrian to cross, the system may control the lighting mechanism to convey an unsafe condition by, for example, deactivating the lighting mechanism or by varying the lighting mechanism in some manner (e.g., by changing the color, flash pattern, brightness, etc.). As an example, the system may control the lighting mechanism to output a flashing red light when it is unsafe for the pedestrian to cross the road crossing.

Additionally, in one embodiment, the system can control the lighting mechanism to output light in a manner that enhances aspects about the road crossing to convey other information, such as the time remaining to cross the road crossing. For example, the system may control the lighting mechanism to output shadow features around stripes of a crosswalk, where the shadows increase/decrease in length/ size depending on the time remaining for a pedestrian to cross the road crossing. As another example, the system may control the lighting mechanism to output a light bar that decreases in length as the time remaining to cross the road crossing safely decreases. In this way, the system improves communicating when it is safe for a pedestrian to cross a street.

Referring to FIG. 1, an example of a road crossing 100 is illustrated. As used herein, a "road crossing" is part of a road, such as a crosswalk or a street, that can be traversed by a road user (e.g., a pedestrian, cyclist, runner, scooter, etc.). In one or more implementations, the road crossing 100 is a pedestrian crosswalk and the road user is a pedestrian 110. While arrangements will be described herein with respect to pedestrians crossing the road crossing 100, it will be understood that embodiments are not limited to pedestrians. In some implementations, the road user may be a bicyclist, scooter, or other road user.

The road crossing 100 also includes various elements. It will be understood that in various embodiments it may not be necessary for the road crossing 100 to have all of the elements shown in FIG. 1. The road crossing 100 can have any combination of the various elements shown in FIG. 1. Further, the road crossing 100 can have additional elements to those shown in FIG. 1. In some arrangements, the road crossing 100 may be implemented without one or more of the elements shown in FIG. 1. While the various elements are shown as being located in close proximity to the road crossing 100 in FIG. 1, it will be understood that one or more of these elements can be physically separated by large distances.

It will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

In one configuration, the road crossing 100 includes a lighting mechanism 120. The lighting mechanism 120 is, in one or more embodiments, a light or arrangement of lights that can convey a safety condition of the road crossing. For example, the light or arrangement of lights can include an arrangement of light emitting diodes (LEDs) embedded in the road crossing 100. Although FIG. 1 illustrates the lighting mechanism 120 as including lights embedded in distinct rows along the road crossing 100, the lights of the lighting mechanism 120 may be arranged in other manners. For example, the lights may cover the road crossing 100, form a pattern along the road crossing 100 (e.g., an arrangement of lights that form shapes, line patterns, etc.), and/or be located on distinct regions of the road crossing 100 (e.g., lights arranged on the outline of the road crossing 100, down the middle of the road crossing 100, at the ends of the road crossing 100, etc.). Further, instead of or in addition to the lights being embedded into the road crossing 100, the lighting mechanism 120 may include a projector located on nearby infrastructure, where the lighting mechanism 120 controls the projector to project light onto the road crossing 100. The lighting mechanism 120 can project the light to cover the road crossing 100, to cover distinct portions of the road crossing 100, to output a pattern, etc.

Further, in one embodiment, the lighting mechanism 120 includes a projector located on or within a device of a road user (e.g., a smartphone, smart accessory, such as a hat, vest, pants, shirt, etc.). Accordingly, in one approach, the lighting mechanism 120 can project light from the device of the road user to cover the road crossing 100, to cover distinct portions of the road crossing 100, to output a pattern, to output text, etc. As an example, the lighting mechanism 120 can project a virtual crosswalk from the device of the road user onto the road surface in front of the road user to assist the road user and surrounding road users in seeing the path of the road user and the virtual crosswalk. In one embodiment, the projection from the device of the road user is projected directly within the line of sight of the road user to increase visibility of the projection and to guide the road user.

The road crossing 100 additionally includes one or more sensors 130. In one embodiment, the sensors 130 are sensors connected to infrastructure in the vicinity of the road crossing 100, such as stoplight sensors, building sensors, vehicle sensors, mobile device (e.g., a smartphone) sensors of the pedestrian 110, etc. The sensors 130 may include cameras, radars, light detection and ranging sensors (LiDARs) and/or other sensors for monitoring the movement of the pedestrian 110. For example, the sensors 130 can acquire sensor data, such as location data, image data, video data, radar data, LiDAR data, ultrasound data, 3D point cloud data, etc., associated with the pedestrian 110.

In one approach, the sensors 130 additionally acquire sensor data about a vehicle 140 near the road crossing 100. The vehicle 140, is in one embodiment, any form of motorized transport. In one or more implementations, the vehicle 140 is an automobile. While arrangements will be described herein with respect to automobiles, it will be understood that embodiments are not limited to automobiles. In some implementations, the vehicle 140 may be any device that, for example, uses the road and passes over the road crossing 100, such as a bicycle, motorcycle, train, trolly, etc. In one arrangement, the sensors 130 include sensors that are part of the vehicle 140 or another remote system, where the sensors include sensors for monitoring a driver of the vehicle 140, the condition of the vehicle 140, and driving parameters of the vehicle 140 (e.g., the speed, acceleration, etc., of the vehicle 140). For example, the sensors 130 can acquire sensor data, such as inertial measurement unit (IMU) data, location data, image data, video data, radar data, LiDAR data, ultrasound data, etc., associated with the vehicle 140. Moreover, while FIG. 1 illustrates the road crossing 100 as including only one vehicle 140 near the road crossing 100, it should be understood that embodiments are not limited to one vehicle being near the road crossing 100. In some implementations, multiple vehicles similar to the vehicle 140 or other road-based dynamic objects are present near the road crossing 100.

In one embodiment, the road crossing 100 further includes a lighting system 150 for controlling the activation of the lighting mechanism 120 in response to acquiring and processing the sensor data from the sensors 130. For example, in response to receiving the sensor data associated with the pedestrian 110, the lighting system 150 determines whether or not the pedestrian 110 intends on crossing the road crossing 100. In one configuration, responsive to determining that the pedestrian 110 intends on crossing the road crossing 100, the lighting system 150 determines a safety condition for the pedestrian 110 to cross the road crossing 100 based, at least in part, on the movement of the pedestrian 110 and the behavior of the vehicle 140. The lighting system 150, in one approach, controls the lighting mechanism 120 to convey the safety condition. For example, if the lighting system 150 determines that it is safe for the pedestrian 110 to cross the road crossing 100, the lighting system 150 controls the lighting mechanism 120 to activate.

In one embodiment, the lighting system 150 may convey additional information to the pedestrian 110 using the lighting mechanism 120. The lighting system 150, in one arrangement, controls the lighting mechanism 120 to show the pedestrian 110 the time remaining to safely cross the road crossing 100 using shadows that surround stripes of a crosswalk. For example, as the time remaining decreases, the lighting system 150 controls the lighting mechanism 120 to reduce the size/length of the shadows. In one configuration, the lighting system 150 controls the lighting mechanism 120 to output a visual light bar that shows the pedestrian 110 how much time remains to safely cross the road crossing 100. For example, when the lighting system 150 initially determines that it is safe for the pedestrian 110 to cross the road crossing 100, the lighting mechanism 120 controls the light bar to span the entire length of the road crossing 100. As the time remaining to safely cross the road crossing 100 decreases, the lighting system 150 controls the lighting mechanism 120 to output the light bar as decreasing in length. Further, in addition to conveying the time remaining to safely cross the road crossing 100, the lighting system 150, in one embodiment, conveys which area of the road crossing 100 the pedestrian 110 should be located at to safely cross the road crossing 100. As an example, the lighting system 150 may control the lighting mechanism 120 to dynamically output light/a message/a symbol at a point along the road crossing 100 that indicates the location the pedestrian 110 should be at during a specific point in time if the pedestrian 110 wants to cross the road crossing 100 before the safety condition changes (i.e., before the safety condition becomes unsafe). In this way, the lighting system 150 improves communicating a safety condition to pedestrians by selectively activating the lighting mechanism 120.

Figure 2:
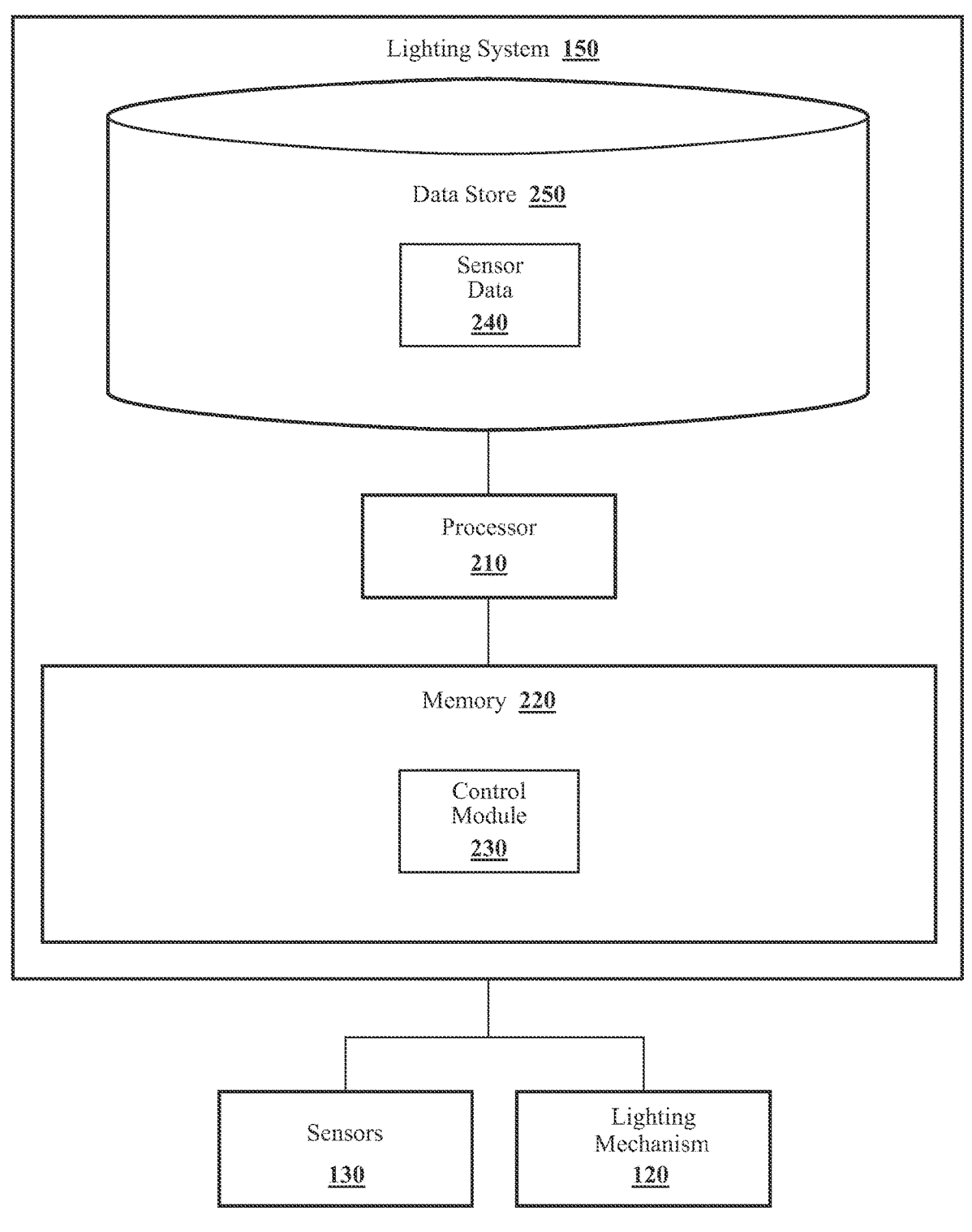
FIG. 2 illustrates one embodiment of a lighting system that is associated with improving the communication of a safety condition at a road crossing.

With reference to FIG. 2, one embodiment of the lighting system 150 of FIG. 1 is further illustrated. The lighting system 150 is shown as including a processor 210. Accordingly, the processor 210 may be a part of the lighting system 150, or the lighting system 150 may access the processor 210 through a data bus or another communication path. In one embodiment, the lighting system 150 includes a memory 220 that stores a control module 230. The memory 220 is a random-access memory (RAM), read-only memory (ROM), a hard-disk drive, a flash memory, or other suitable memory for storing the control module 230. The control module 230 is, for example, computer-readable instructions that when executed by the processor 210 cause the processor 210 to perform the various functions disclosed herein.

The control module 230 generally includes instructions that function to control the processor 210 to receive data inputs from one or more sensors of the road crossing 100. The inputs are, in one embodiment, observations of one or more objects in an environment proximate to the road crossing 100 and/or other aspects about the surroundings. As provided for herein, the control module 230, in one embodiment, acquires sensor data 240 that includes at least camera images. In further arrangements, the control module 230 acquires the sensor data 240 from further sensors such as a radar, a LiDAR, and other sensors as may be suitable for identifying nearby pedestrians and vehicles and the movement/behavior of the nearby pedestrians and vehicles. Accordingly, the control module 230, in one embodiment, controls the respective sensors to provide the data inputs in the form of the sensor data 240. Additionally, while the control module 230 is discussed as controlling the various sensors to provide the sensor data 240, in one or more embodiments, the control module 230 can employ other techniques to acquire the sensor data 240 that are either active or passive. For example, the control module 230 may passively sniff the sensor data 240 from a stream of electronic information provided by the various sensors to further components within the road crossing 100. Moreover, the control module 230 can undertake various approaches to fuse data from multiple sensors when providing the sensor data 240 and/or from sensor data acquired over a wireless communication link. Thus, the sensor data 240, in one embodiment, represents a combination of perceptions acquired from multiple sensors.

In one approach, the control module 230 acquires the sensor data 240 from one or more nearby devices wirelessly connected to the road crossing 100. The sensor data 240 includes, for example, a location, movement information, and behavior information associated with a pedestrian and/or vehicle in the vicinity of the road crossing 100 as indicated by 3D point cloud data, camera images and/or video from cameras, radar measurements, global positioning system (GPS) data, and so on. Devices may include a smartphone, security system, vehicle, etc.

The control module 230 can establish wireless connections by connecting the lighting system 150 directly to local devices and/or to a remote server that acquires the sensor data 240 of the local devices. For example, the control module 230 may establish a wireless communication link with nearby devices using a handshake process (e.g., over a Wi-Fi® network or via Bluetooth®). Responsive to the control module 230 establishing a wireless communication link with local devices and/or a remote server, the control module 230 acquires the sensor data 240 relating to the behavior, movements, and locations of pedestrians and vehicles in the vicinity of the road crossing 100. In this way, the control module 230 receives additional sensor data beyond what is acquired from the sensors 130 of the road crossing 100.

Moreover, in one embodiment, the lighting system 150 includes a data store 250. In one embodiment, the data store 250 is a database. The database is, in one embodiment, an electronic data structure stored in the memory 220 or another data store and that is configured with routines that can be executed by the processor 210 for analyzing stored data, providing stored data, organizing stored data, and so on. Thus, in one embodiment, the data store 250 stores data used by the control module 230 in executing various functions. In one embodiment, the data store 250 includes the sensor data 240.

The control module 230, in one embodiment, is further configured to perform additional tasks beyond controlling the respective sensors to acquire and provide the sensor data 240. For example, the control module 230 includes instructions that cause the processor 210 to process the sensor data 240 to identify an intention to cross the road crossing 100 of the pedestrian 110. In one approach, the control module 230 identifies the intention of the pedestrian 110 by processing the sensor data 240 to identify various aspects about the pedestrian 110, such as a gait, a speed, an orientation, and a location of the pedestrian 110.

As previously discussed, the sensor data 240 associated with the pedestrian 110 may include image, video, radar, and/or LiDAR data captured by the sensors 130 of the road crossing 100 and/or by nearby devices. In one arrangement, the control module 230 identifies the location and orientation of the pedestrian 110 by extracting features from the acquired image, video, radar, and/or LiDAR data. In various approaches, the control module 230 employs different object recognition techniques to identify the location and orientation of the pedestrian 110. The particular technique employed to identify the location/orientation may depend on available sensors near the road crossing 100, computational abilities (e.g., processor power) of the road crossing 100, and so on.

In one approach, the control module 230 uses a machine learning algorithm embedded within the control module 230, such as a convolutional neural network (CNN), to perform semantic segmentation over the sensor data 240 associated with the location and position of the pedestrian 110 from which further information is derived. Of course, in further aspects, the control module 230 may employ different machine learning algorithms or implements different approaches for performing the associated functions, which can include deep convolutional encoder-decoder architectures, or another suitable approach that identifies objects represented in the image. Whichever particular approach the control module 230 implements, the control module 230 provides an output identifying the pedestrian 110 represented in the sensor data 240. In this way, the control module 230 identifies characteristics about the pedestrian 110, such as the location and position of the pedestrian 110 from the sensor data 240.

Accordingly, the control module 230 correlates identified characteristics about the pedestrian 110 with an intention of the pedestrian 110. The control module 230, in one configuration, determines the location of the pedestrian based on the sensor data 240 acquired by the sensors 130 of the road crossing 100. Responsive to the control module 230 determining that the pedestrian 110 is located close to the road crossing 100, the control module 230 determines that the pedestrian 110 likely (e.g., beyond a defined threshold of likelihood) intends on crossing the road crossing 100. Further, in addition to identifying a current location of the pedestrian 110, the control module 230 can analyze the sensor data 240 to identify changes in the location of the pedestrian 110 near the road crossing 100. For example, the control module 230 may analyze the sensor data 240 to determine that the pedestrian 110 is walking towards the road crossing 100 over a period of time.

In one approach, the control module 230 analyzes the sensor data 240 to determine the orientation and/or position of the pedestrian 110 near the road crossing 100. For example, the control module 230 may process image/video data acquired by the sensors 130 to identify which direction a face of the pedestrian 110 is directed towards. In one embodiment, the control module 230 determines that the user intends on crossing the road crossing 100 when the face of the pedestrian 110 is directed towards the road crossing 100.

In addition to identifying the relative location and orientation of the pedestrian 110 in relation to the road crossing 100, the control module 230 can identify a gait and speed of the pedestrian 110. Based on the gait and/or speed of the pedestrian 110, the control module 230 can determine whether the pedestrian 110 intends on crossing the road crossing 100.

Although the control module 230 is described as processing the sensor data 240 within the lighting system 150 of the road crossing 100, it should be understood that in one or more arrangements, the sensor data 240 is processed and analyzed off-board the road crossing 100. For example, the sensor data 240 may be sent to and processed in a cloud-computing environment accessible by the control module 230. In this way, the strain on computational resources of the road crossing 100 can be reduced.

Responsive to determining that the pedestrian 110 intends on crossing the road crossing 100, the control module 230 determines whether it is safe for the pedestrian 110 to cross the road crossing 100. In one approach, the control module 230 determines whether it is safe for the pedestrian 110 to cross by identifying a safety condition associated with the road crossing 100, where the safety condition is based, at least in part, on driving behavior of the vehicle 140 approaching the road crossing 100. In one embodiment, the driving behavior of the vehicle 140 includes a driving history and a real-time condition of the vehicle 140. As previously discussed, the sensor data 240 associated with the vehicle 140 may include IMU data, location data, image data, video data, radar data, LiDAR data, ultrasound data, 3D point cloud data, etc., associated with the vehicle 140.

In one arrangement, the control module 230 determines the real-time condition of the vehicle 140 based on the sensor data 240. The real-time condition includes, for example, an operation condition of the vehicle 140, an environment of the vehicle 140, a speed of the vehicle 140, an acceleration of the vehicle 140, an emotional state of a driver of the vehicle 140, and a current autonomy level of the vehicle 140 (e.g., whether the vehicle 140 is operating in an autonomous, semi-autonomous, or manual mode).

In one embodiment, the control module 230 additionally receives and/or accesses information associated with a driving history of the vehicle 140. In one approach, the vehicle 140 and/or a remote server stores a profile associated with the vehicle 140, where the profile includes information associated with the driving history of the vehicle 140, such as whether the vehicle 140 has a tendency to yield to pedestrians at road crossings, whether the vehicle 140 tends to follow instructions output from infrastructure (e.g., whether the vehicle 140 stops at stop signs and red lights), whether the vehicle 140 tends to obey local safety regulations (e.g., whether the vehicle 140 regularly violates speed limits), etc.

In addition to considering the driving behavior of the vehicle 140, the control module 230, in one or more arrangements, identifies the safety condition associated with the pedestrian 110 crossing the road crossing 100 by determining a movement profile associated with the pedestrian 110. The movement profile includes, for example, a speed and a gait of the pedestrian 110. In one approach, the control module 230 determines that the safety condition satisfies the pedestrian safety threshold when the movement profile of the pedestrian 110 indicates that the pedestrian 110 is able to cross the road crossing 100 before the vehicle 140 crosses paths with the pedestrian 110.

Responsive to determining the safety condition associated with the pedestrian 110 crossing the road crossing 100, the control module 230 controls the lighting mechanism 120 of the road crossing 100 to convey the safety condition. In one approach, the control module 230 controls the lighting mechanism to activate a light/lights embedded in or projected onto the road crossing 100 that indicates it is safe to cross.

In one approach, the control module 230 controls the lighting mechanism 120 to vary the output of the lights by varying the brightness, color, and/or flash pattern of the lights. For example, when it is safe to cross, the control module 230 may control the lighting mechanism to output the lights in a manner that conveys the safe condition, such as by outputting bright, colorful solid lights easily discernible by the pedestrian 110. On the other hand, if the safety condition indicates an unsafe condition for the pedestrian 110 to cross the road crossing 100 (i.e., when the vehicle safety threshold and/or the pedestrian safety threshold is not satisfied), the control module 230 controls the lighting mechanism 120 to deactivate, stay in an "off" state, or indicate the unsafe condition in another manner. In one embodiment, the control module 220 conveys additional information to the pedestrian 110 using the lighting mechanism 120. For example, the control module 220 may control the lighting mechanism 120 to output light in a manner that shows the pedestrian 110 the time remaining for the pedestrian 110 to safely cross the road crossing 100 and/or a point along the road crossing 100 where the pedestrian 110 would be safest/where the pedestrian 110 should be located to safely cross the road crossing 100.

In one embodiment, the control module 230 controls the lights to activate/deactivate in relation to lights output by a stoplight present at the road crossing 100. The control module 230, in one configuration, controls the lighting mechanism 120 to activate at the exact time a red light is shown to the vehicle 140. In one approach, the control module 230 delays activation of the lights when the driving behavior of the vehicle 140 indicates that the vehicle 140 is unlikely to stop even in the presence of a red light or stop sign. For example, if the vehicle 140 has a history of running red lights and is currently accelerating towards a red light at the road crossing 100, the control module 230 delays the activation of the lighting mechanism 120 until the vehicle 140 comes to a complete stop and/or the vehicle 140 crosses the road crossing 100. In this way, the lighting system 150 improves conveying a safe crossing condition to a pedestrian at a road crossing.

Figure 3:
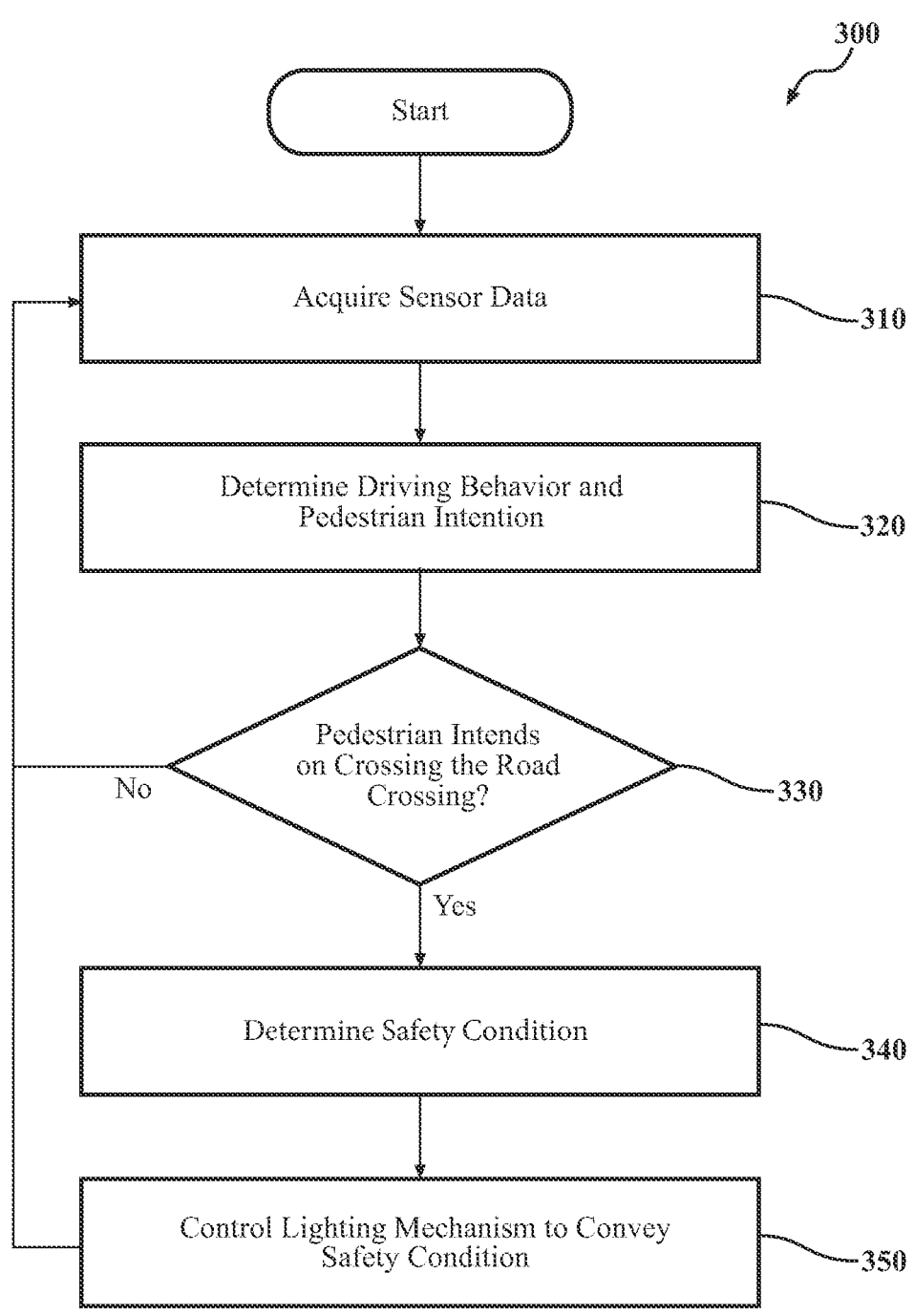
FIG. 3 illustrates one embodiment of a method that is associated with improving the safety of a pedestrian at a road crossing.

Additional aspects of improving the safety of a pedestrian at a road crossing will be discussed in relation to FIG. 3. FIG. 3 illustrates a flowchart of a method 300 that is associated with improving pedestrian safety at a road crossing by using a lighting mechanism. Method 300 will be discussed from the perspective of the lighting system 150 of FIGS. 1, and 2. While method 300 is discussed in combination with the lighting system 150, it should be appreciated that the method 300 is not limited to being implemented within the lighting system 150 but is instead one example of a system that may implement the method 300.

At 310, the control module 230 controls the sensor system 130 to acquire the sensor data 240. In one embodiment, the control module 230 controls the sensors 130, where the sensors 130 are for example, cameras, radars, LiDARs, ultrasound sensors, etc., to acquire the sensor data 240 associated with an environment of the road crossing 100. As part of controlling the sensors to acquire the sensor data 240, it is generally understood that the sensors acquire the sensor data 240 of a region around the road crossing 100 with data acquired from different types of sensors generally overlapping in order to provide for a comprehensive sampling of the surrounding environment at each time step. The sensor data 240 of the region around the road crossing could include data related to pedestrians and vehicles around the road crossing 100. In general, the sensor data 240 need not be of the exact same bounded region in the surrounding environment but should include a sufficient area of overlap such that distinct aspects of the area can be correlated. Thus, the control module 230, in one embodiment, controls the sensors to acquire the sensor data 240 of the surrounding environment.

Additionally, the control module 230 controls sensors near the road crossing 100, such as sensors from nearby vehicles, mobile devices, and infrastructure to acquire the sensor data 240 associated with the pedestrian 110 and the vehicle 140. As part of controlling the sensors to acquire the sensor data 240, it is generally understood that the sensors acquire the sensor data 240 of a region around the road crossing 100 with data acquired from different types of sensors generally overlapping in order to provide for a comprehensive sampling of the road crossing 100. The sensor data 240 of the region around the road crossing 100 could include data related to the pedestrian 110 (e.g., the speed, gait, location, orientation, position, orientation, etc., of the pedestrian 110) and data related to the vehicle 140. Thus, the control module 230, in one embodiment, controls the sensors to acquire the sensor data 240 about the road crossing 100.

Moreover, in further embodiments, the control module 230 controls the sensors to acquire the sensor data 240 at successive iterations or time steps. Thus, the lighting system 150, in one embodiment, iteratively executes the functions discussed at blocks 310-320 to acquire the sensor data 240 and provide information therefrom. Furthermore, the control module 230, in one embodiment, executes one or more of the noted functions in parallel for separate observations in order to maintain updated perceptions. Additionally, as previously noted, the control module 230, when acquiring data from multiple sensors, fuses the data together to form the sensor data 240 and to provide for improved determinations of detection, location, and so on.

At 320, the control module 230 processes the sensor data 240 to determine an intention of the pedestrian 110 and a driving behavior of the vehicle 140. In one approach, the control module 230 identifies the intention of the pedestrian 110 by processing the sensor data 240 to identify various aspects about the pedestrian 110, such as a gait, a speed, an orientation, and a location of the pedestrian 110. The sensor data 240 associated with the pedestrian 110 may include image, video, radar, GPS, and/or LiDAR data captured by the sensors 130 of the road crossing 100 and/or by nearby devices. In one arrangement, the control module 230 identifies the location and orientation of the pedestrian 110 by extracting features from the acquired image, video, radar, and/or LiDAR data. In various approaches, the control module 230 employs different object recognition techniques to identify the location and orientation of the pedestrian 110. The particular technique employed to identify the location/orientation may depend on available sensors near the road crossing 100, computational abilities (e.g., processor power) of the road crossing 100, and so on.

In one approach, the control module 230 uses a machine learning algorithm embedded within the control module 230, such as a convolutional neural network (CNN), to perform semantic segmentation over the sensor data 240 associated with the location and position of the pedestrian 110 from which further information is derived. Of course, in further aspects, the control module 230 may employ different machine learning algorithms or implements different approaches for performing the associated functions, which can include deep convolutional encoder-decoder architectures, or another suitable approach that identifies objects represented in the image. Whichever particular approach the control module 230 implements, the control module 230 provides an output identifying the pedestrian 110 represented in the sensor data 240. In this way, the control module

230 identifies characteristics about the pedestrian 110, such as the location and position of the pedestrian 110 from the sensor data 240.

The control module 230, in one configuration, determines the location of the pedestrian based on the sensor data 240 acquired by the sensors 130 of the road crossing 100. In one approach, the control module 230 determines the location of the pedestrian 110 by comparing the position of the pedestrian 110 to another known object in the environment of the road crossing 100. For example, the control module 230 may process image and/or video data acquired by the sensors 130 to identify whether the pedestrian 110 is located within a threshold distance (e.g., within three feet) of the road crossing 100 or a stop light attached to the road crossing 100.

In one approach, instead of or in addition to using the sensor data 240 acquired by the sensors 130, the control module 230 receives location data (e.g., GPS data) from a mobile device of the pedestrian 110 and/or sensor data from nearby infrastructure/vehicles to identify the location of the pedestrian 110 in relation to the road crossing 100. For example, GPS data may indicate that the pedestrian 110 is at a location exactly three feet from the road crossing 100. In one embodiment, responsive to the control module 230 determining location of the pedestrian, the control module 230 determines whether the pedestrian 110 intends on crossing the road crossing 100. As an example, if the pedestrian 110 is within a threshold distance of the road crossing 100, the control module 230 determines that the pedestrian 110 intends on crossing the road crossing 100. Further, in addition to identifying a current location of the pedestrian 110, the control module 230 can analyze the sensor data 240 to identify changes in the location of the pedestrian 110 near the road crossing 100.

In one approach, the control module 230 analyzes the sensor data 240 to determine that the pedestrian 110 is walking towards the road crossing 100 over a period of time. For example, GPS or navigation data received from a mobile device of the pedestrian 110 may indicate that the pedestrian is following a path that requires the pedestrian 110 to cross the road crossing 100. As another example, the image and/or video data about the pedestrian 110 may indicate that the pedestrian 110 is progressing towards the road crossing 100. Thus, in one embodiment, the control module 230 determines that the pedestrian 110 intends on crossing the road crossing 100 when the pedestrian 110 is approaching the road crossing 100 as indicated by the location data associated with the pedestrian 110.

In one arrangement, the control module 230 analyzes the sensor data 240 to determine the orientation and/or position of the pedestrian 110 near the road crossing 100. For example, the control module 230 may process image/video data acquired by the sensors 130 to identify which direction a face and/or front side of the body of the pedestrian 110 is directed towards. In one embodiment, the control module 230 determines that the user intends on crossing the road crossing 100 when the face/front portion of the body of the pedestrian 110 is directed towards the road crossing 100. The control module 230 may determine which direction the user is facing by, in one configuration, analyzing the sensor data 240 to identify facial features of the pedestrian 110. For example, the control module 230 may determine which direction the eyes of the pedestrian 110 are directed towards. If the eyes of the pedestrian 110 are directed towards the road crossing/across a street that the road crossing 100 can connect the pedestrian 110 to, the control module 230 determines that the pedestrian 110 intends to cross the road crossing 100. On the other hand, if the pedestrian 110 is standing near the road crossing 100 but facing a direction opposite of the road crossing 100 (e.g., as indicated by the gaze of the pedestrian 110), then the control module 230 determines that the pedestrian 110 does not intend on crossing the road crossing 100.

In addition to identifying the relative location and orientation of the pedestrian 110 in relation to the road crossing 100, the control module 230 can identify a behavior/movement of the pedestrian 110 near the road crossing, where the behavior/movement may include a gait and speed of the pedestrian 110. For example, the control module 230 may identify the speed of the pedestrian 110 by processing and analyzing radar data associated with the pedestrian 110. In one approach, the control module 230 identifies the gait of the pedestrian 110 by processing and analyzing camera/video data associated with the pedestrian 110 to determine how the pedestrian 110 is moving (e.g., the average cadence, stride, etc. of the pedestrian 110). Based on the gait and/or speed of the pedestrian 110, the control module 230 can determine whether the pedestrian 110 intends on crossing the road crossing 100. As an example, if the pedestrian 110 is walking at a constant pace and speed towards the road crossing 100, the control module 230 determines that the pedestrian 110 is likely to continue walking into the road crossing 100.

The behavior of the pedestrian 110 can include information beyond the gait and speed of the pedestrian 110. For example, in one approach, the control module 230 processes and analyzes the sensor data 240 to determine whether the pedestrian 110 is distracted near the road crossing 100. In one arrangement, responsive to determining that the pedestrian 110 is distracted near the road crossing 100, the control module 230 determines that the pedestrian 110 does not intend on crossing the road crossing 100. The control module 230 determines whether the pedestrian 110 is distracted by, in one embodiment, processing image/video data associated with the pedestrian 110 at the road crossing 100. For example, if the control module 230 processes the sensor data 240 to determine that the pedestrian 110 is texting/on the phone, talking to someone else, eating/drinking, etc., then the control module 230 determines the pedestrian 110 is distracted and does not intend on crossing the road crossing 100. In addition to identifying whether pedestrian 110 is distracted, the control module 230 may process the sensor data 240 to determine whether other behavior of the pedestrian 110 indicates that the pedestrian 110 is unlikely to cross the road crossing 100. Other behavior includes, for example, the pedestrian 110 sitting on a bench near the road crossing 100, pacing back and forth near the road crossing 100, waiting for a vehicle near the road crossing 100, etc. In any case, the control module 230, in one approach determines the intent of the pedestrian 110 based on the behavior of the pedestrian 110.

Further, in one approach, the control module 230 determines whether the pedestrian 110 intends on crossing the road crossing 100 depending on whether the pedestrian 110 enters an input on a crosswalk signal at the road crossing 100. For example, road crossings, such as crosswalks, may include light posts or stop lights with buttons that can be pressed by a user when a user wants to receive a signal that it is safe to cross the street. Accordingly, the control module 230 may determine that the pedestrian 110 intends on crossing the street by processing the image and/or video data near the road crossing 100 to identify that the pedestrian 110 entered an input indicative of an intention to cross the street. On the other hand, the control module 230 may determine that the pedestrian 110 does not intend on crossing the road crossing 100 by processing the sensor data 240 to determine that the pedestrian 110 did not enter an input indicative of an intention to cross the street.

In any case, the control module 230 determines the intention of the pedestrian 110 by analyzing and processing the sensor data 240 associated with the pedestrian 110. If the location, orientation/position, and behavior of the pedestrian 110 reflect that the pedestrian 110 is likely to cross the road crossing 100, then the control module 230 determines that the pedestrian 110 intends on crossing the road crossing 100. Although the control module 230 is described as processing the sensor data 240 within the lighting system 150 of the road crossing 100, it should be understood that in one or more arrangements, the sensor data 240 is processed and analyzed off-board the road crossing 100. For example, the sensor data 240 may be sent to and processed in a cloud-computing environment accessible by the control module 230. In this way, the strain on computational resources of the road crossing 100 can be reduced.

With continued reference to 320, in addition to determining the intention of the pedestrian 110, the control module 230 determines driving behavior associated with the vehicle 140. In one embodiment, the driving behavior of the vehicle 140 includes a driving history and a real-time condition of the vehicle 140. The sensor data 240 associated with the vehicle 140 may include IMU data, location data, image data, video data, radar data, LiDAR data, ultrasound data, 3D point cloud data, etc., associated with the vehicle 140.

In one arrangement, the control module 230 determines the real-time condition of the vehicle 140 based on the sensor data 240. The real-time condition includes, for example, an operation condition of the vehicle 140, an environment of the vehicle 140, a speed of the vehicle 140, an acceleration of the vehicle 140, an emotional state of a driver of the vehicle 140, and a level of autonomy of the vehicle 140. In one approach, the control module 230 processes and analyzes the sensor data 240 acquired by cameras and radars installed in the road crossing 100 to determine the real-time condition of the vehicle 140. As an example, the control module 230 can process and analyze sensor data acquired by a radar sensor of the road crossing 100 to identify a current speed of the vehicle 140. Further, the control module 230 may process and analyze image/video data acquired by cameras of the road crossing 100 to identify a driving pattern of the vehicle 140, such as whether the vehicle is swerving, behaving erratically, etc.

Additionally, instead of using the sensors 130, the control module 230, in one approach, receives the sensor data 240 from the vehicle 140. For example, the control module 230 may receive IMU data indicative of the current speed and acceleration of the vehicle 140. Accordingly, the control module 230, in one embodiment, processes the received IMU to determine the current operating parameters, such as the speed and acceleration of the vehicle 140. As another example, the control module 230 may receive image/video data acquired by internal cameras of the vehicle 140 that acquire sensor data indicative of a current state of the driver of the vehicle 140, etc. Image/video data acquired by internal cameras can include image/video data indicative of facial features of the driver, eye/head movements of the driver, gestures of the driver, the posture of the driver, etc. As such, the control module 230, in one embodiment, processes the received sensor data 240 to determine the current state of the driver. In one approach, the control module 230 determines the current emotional state of the driver. For example, the control module 230 may determine whether the driver is calm, happy, angry, agitated, drowsy, distracted, etc.

In one approach, instead of processing the sensor data 240 acquired by the vehicle 140, the control module 230 receives the processed sensor data 240 directly from the vehicle 140 and/or by accessing a cloud-computing environment that stores the processed sensor data 240 of the vehicle 140. As an example, a computing system on-board the vehicle 140 may identify the current emotional state of the driver based on the sensor data acquired by the vehicle 140 and/or based on receiving other information associated with the driver, such as the driver's calendar, sleep schedule, conversations, etc. In one approach, the control module 230 may determine that the emotional state correlates to an unsafe driving behavior. For example, if the driver data indicates that the driver did not sleep much the night before operating the vehicle 140 and is thus drowsy, the control module 230 determines that the driving behavior of the vehicle 140 is unsafe. As another example, if the interior cameras of the vehicle 140 identify an angered/agitated state of the driver, the control module 230 determines that the driving behavior of the vehicle 140 is unsafe. On the other hand, if the driver state is calm/happy, the control module 230 determines that the driving behavior of the vehicle 140 is safe.

In one configuration, the control module 230 may access and/or receive additional information about the real-time condition of the vehicle 140. For example, the control module 230 can identify whether the components of the vehicle 140 (e.g., the brakes, steering column, etc.) are operating up to standard responsive to receiving information relating to the last time the vehicle 140 received service, whether the vehicle 140 is currently experiencing malfunctions, etc. In one arrangement, the control module 230 accesses the additional information from the cloud-computing environment, a remote server, and/or directly from the vehicle 140. As an example, if the brakes of the vehicle 140 are damaged or worn down, the control module 230 determines that the driving behavior of the vehicle 140 is unsafe.

In one configuration, the real-time condition of the vehicle 140 also includes a current environment of the vehicle 140. For example, the vehicle 140 may operate different depending on local standards. Therefore, the control module 230, in one approach, determines that the vehicle 140 is likely to operate in a particular manner depending on the current environment of the vehicle 140. As an example, in busy, urban areas (e.g., in cities), vehicles may be less likely to stop at red lights than when vehicles are in residential, suburban areas. As yet another example, vehicles may behave differently depending on the country, state, and/or city the road crossing 100 is located in. In some countries, for example, it is common for vehicles to yield to pedestrians at a road crossing 100. However, in other countries, vehicles may be less likely to yield to pedestrians. In any case, the control module 230, in one approach, determines the real-time condition of the vehicle 140 based on the current environment of the vehicle 140. For example, if the vehicle 140 is in a city where vehicles do not stop at red lights, the control module 230 determines that the driving behavior of the vehicle 140 is unsafe.

Further, in one approach, the real-time condition of the vehicle 140 includes a current autonomy level of the vehicle 140. The control module 230, in one embodiment, determines whether the vehicle 140 is being operated autonomously, semi-autonomously, or manually. If, for example, the vehicle 140 is being operated autonomously, the control module 240 determines that the driving behavior of the vehicle 140 is safe because safety systems of the vehicle 140 are likely to prevent the vehicle 140 from violating local ordinances/rules of the road. On the other hand, if the vehicle 140 is being operated manually, semi-autonomously, and/or with influence by the driver of the vehicle 140, the control module 230 determines that the driving behavior of the vehicle 140 is less safe than in an autonomous mode as the vehicle 140 is controlled directly by a human driver rather than with the additional precautions provided by autonomous safety systems.

In one embodiment, the control module 230 additionally receives and/or accesses information associated with a driving history of the vehicle 140. In one approach, the vehicle 140 and/or a remote server stores a profile associated with the vehicle 140, where the profile includes information associated with the driving history of the vehicle 140, such as whether the vehicle 140 has a tendency to yield to pedestrians at road crossings, whether the vehicle 140 tends to follow instructions output from infrastructure (e.g., whether the vehicle 140 stops at stop signs and red lights), whether the vehicle 140 tends to obey local safety regulations (e.g., whether the vehicle 140 regularly violates speed limits), etc. In one approach, the profile is updated after every vehicle trip so that the driving history of the vehicle 140 remains up to date when accessed by the control module 230. If, for example, the driving history of the vehicle 140 corresponds to the vehicle 140 never yielding to pedestrians and regularly running red lights, the control module 230 determines the driving behavior of the vehicle 140 is unsafe. On the other hand, if the driving history of the vehicle 140 indicates that the vehicle 140 always follows speed limits and regularly yields to pedestrians, the control module 230 determines the driving behavior is safe.

At 330, the control module 230 determines whether the pedestrian 110 intends on crossing the road crossing 100. For example, as previously discussed, the control module 230 determines whether the pedestrian 110 is likely to cross by analyzing the sensor data associated with the location, position, and behavior of the pedestrian 110. If the control module 230 determines that the location, position, and behavior of the pedestrian 110 indicate that the pedestrian is likely to cross the road crossing 100, the control module 230 determines whether it is safe for the pedestrian 110 to cross the road crossing 100 at step 340. Otherwise, the control module 230 continues to acquire the sensor data 240 as discussed at step 310.

At 340, responsive to determining that the pedestrian 110 intends on crossing the road crossing 100, the control module 230 determines a safety condition associated with the pedestrian 110 crossing the road crossing 100. In one approach, the safety condition is based, at least in part, on driving behavior of the vehicle 140 approaching the road crossing 100. As previously discussed, the driving behavior includes a real-time condition and driving history associated with the vehicle 140. In one approach, the control module 230 determines that it is safe for the pedestrian 110 to cross the road crossing 100 when the safety condition satisfies a vehicle safety threshold.

In one approach, the control module 230 determines that the safety condition satisfies the vehicle safety threshold when the vehicle 140 is likely to stop before reaching the road crossing 100 or if the driving behavior of the vehicle 140 is otherwise safe. If, for example, the driving history indicates that the vehicle 140 has a tendency to drive through red lights and not yield to pedestrians, the real-time condition of the vehicle 140 indicates that the driver of the vehicle 140 is agitated, speeding, and in a manual mode and/or the control module 230 otherwise determines that the driving behavior of the vehicle 140 is unsafe, then the control module 230 determines that the vehicle 140 is unlikely to stop at the road crossing 100. Thus, the safety condition does not satisfy the vehicle safety threshold. If, on the other hand, the driving history indicates that the vehicle 140 always yield to pedestrians, and the real-time condition indicates that the driver is calm, driving the speed limit, and/or operating in an autonomous mode, the control module 230 determines the vehicle 140 is likely to stop before reaching the road crossing 100. In this case, the driving behavior and safety condition satisfies the vehicle safety threshold.

In addition to considering the driving behavior of the vehicle 140, the control module 230, in one or more arrangements, determines that it is safe for the pedestrian 110 to cross the road crossing 100 when a movement profile of the pedestrian 110 satisfies a pedestrian safety threshold. The movement profile includes, for example, a speed and a gait of the pedestrian 110. As previously discussed, the control module 230 may determine the speed and gait of the pedestrian 110 by processing and analyzing the sensor data 240. In one approach, the control module 230 determines that the safety condition satisfies the pedestrian safety threshold when the movement profile of the pedestrian 110 indicates that the pedestrian 110 is able to cross the road crossing 100 before the vehicle 140 crosses paths with the pedestrian 110. For example, if the pedestrian 110 is walking fast enough to move across the road crossing 100 before the vehicle 140 reaches the road crossing 100, the control module 230 determines that the pedestrian safety threshold is satisfied. On the other hand, if the pedestrian 110 is walking at a slow pace that would not allow the pedestrian 110 to cross the road crossing 100 before the vehicle 140 reaches the road crossing 100, then the control module 230 determines that the pedestrian safety threshold is not satisfied. The control module 230, in one arrangement, determines that it is safe for the pedestrian 110 to cross the road crossing 100 when the vehicle safety threshold and/or the pedestrian safety threshold is satisfied.

Additionally, in one approach, the control module 230 determines that it is safe for the pedestrian 110 to cross the road crossing 100 when no vehicle is present at and/or approaching the road crossing 100. Thus, even if a stoplight of the road crossing 100 displays a green light/indication to go for vehicle traffic and a red light/indication to stop for pedestrian traffic, the control module 230 determines that it is safe for the pedestrian 110 to cross the road crossing 100 when no vehicle is present or approaching the road crossing 100.

At 350, responsive to determining the safety condition, the control module 230 controls the lighting mechanism 120 to convey the safety condition. In one approach, the control module 230 conveys a safe condition by activating a light/lights embedded in or projected onto the road crossing 100. The control module 230, in one approach, controls the brightness, color, and/or flash pattern of the lights. For example, the control module 230 may control the lighting mechanism 120 to output a bright green flashing light onto the road crossing 100 when it is safe for the pedestrian 110 to cross. In one embodiment, the control module 230 controls the lights to activate in relation to lights output by a stoplight present at the road crossing 100. As an example, the control module 230, in one configuration, controls the lighting mechanism 120 to activate at the exact time a red light is shown to the vehicle 140.

In one approach, the control module 230 controls the lighting mechanism 120 to convey an unsafe condition by controlling the lighting mechanism 120 to deactivate lights or otherwise maintain the lights in an "off" configuration. In one arrangement, the control module 230 varies the output of the lights to convey the unsafe condition. For example, the control module 230 may control the lighting mechanism 120 to output red, flashing lights when it is unsafe for the pedestrian 110 to cross the road crossing 100.

In one embodiment, the control module 220 controls the lighting mechanism 120 to convey additional information to the pedestrian 110. The control module 220, in one arrangement, controls the lighting mechanism 120 to show the pedestrian 110 the time remaining to safely cross the road crossing 100 using projected shadows that surround stripes of a crosswalk. The shadows are, for example, projections of light or arrangements of light that resemble shadows. For example, as the time remaining for the pedestrian 110 to safely cross the road crossing 100 decreases (e.g., as the time remaining until the stop light shows the vehicle 140 a green light decreases, the time remaining until the vehicle 140 enters the road crossing 100 decreases, etc.) the control module 220 controls the lighting mechanism 120 to reduce the size/length of the shadows according to the time remaining. In one configuration, the control module 220 controls the lighting mechanism 120 to output a visual light bar that shows the pedestrian 110 how much time remains to safely cross the road crossing 100. For example, when the control module 220 initially determines that it is safe for the pedestrian 110 to cross the road crossing 100, the lighting mechanism 120 controls the light bar to span the entire length of the road crossing 100. As the time remaining to safely cross the road crossing 100 decreases, the control module 220 controls the lighting mechanism 120 to output the light bar as decreasing in length.

Further, in addition to conveying the time remaining to safely cross the road crossing 100, the control module 220, in one embodiment, controls the lighting mechanism 120 to show which area of the road crossing 100 the pedestrian 110 should currently be located at to safely cross the road crossing 100. As an example, the control module 220 may control the lighting mechanism 120 to dynamically output light/a message/a symbol at a point along the road crossing 100 that indicates the location the pedestrian 110 should be at during a specific point in time if the pedestrian 110 wants to cross the road crossing 100 before the safety condition changes (i.e., before the safety condition becomes unsafe). For example, if the control module 220 determines that for the pedestrian 110 to cross the road crossing 100 before the vehicle 140 enters the road crossing 100 that the pedestrian 110 should be located five meters from the start of the road crossing 100, the control module 220 controls the lighting mechanism 120 to output a light/projection/symbol five meters from the start of the road crossing 100. In this way, the lighting system 150 improves the safety of pedestrians at road crossings.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-3, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system comprising:
one or more processors; and
a memory communicably coupled to the one or more processors and storing instructions that, when executed by the one or more processors, cause the one or more processors to:
acquire sensor data about a pedestrian and a vehicle in surroundings of a road crossing;
identify an intention to cross the road crossing of the pedestrian and a driving behavior of the vehicle, wherein the instructions to identify the driving behavior include instructions to identify the driving behavior based, at least in part, on at least one of: a driving history and a real-time condition of the vehicle;
determine a safety condition for the pedestrian to cross the road crossing based, at least in part, on the driving behavior; and
control at least one lighting mechanism of the road crossing according to the safety condition.

2. The system of claim 1, wherein the instructions further include instructions to determine whether the safety condition satisfies a vehicle safety threshold, and
wherein the safety condition satisfies the vehicle safety threshold when the vehicle is likely to stop before reaching the road crossing.

3. The system of claim 1, wherein the instructions to identify the intention of the pedestrian include instructions to determine at least one of: a gait, a speed, an orientation, and a location of the pedestrian.

4. The system of claim 1, wherein the instructions further include instructions to determine whether the safety condition satisfies a pedestrian safety threshold,
wherein the safety condition satisfies the pedestrian safety threshold when a movement profile of the pedestrian allows the pedestrian to cross the road crossing without a path of the pedestrian and a path of the vehicle intersecting, and
wherein the movement profile is based, at least in part, on at least one of a gait and a speed of the pedestrian.

5. The system of claim 1, wherein the instructions to control the at least one lighting mechanism include instructions to cause a light associated with the road crossing that conveys the safety condition to activate when the safety condition indicates the driving behavior is safe.

6. The system of claim 5, wherein the instructions to control the at least one lighting mechanism include instructions to control at least one of: a brightness, a color, and a flash pattern of the light, and
wherein the light is at least one of: embedded into a surface of the road crossing and projected onto the surface of the road crossing.

7. The system of claim 1, wherein the instructions to acquire the sensor data about the vehicle include instructions to acquire at least one of: the driving history and the real-time condition of the vehicle, and
wherein the instructions to identify the intention include instructions to determine a direction of a gaze of the eyes of the pedestrian to assess whether the pedestrian intends to cross, and wherein identifying the driving behavior includes determining an autonomy level of the vehicle.

8. The system of claim 7, wherein the driving history includes at least one of: a history of yielding to other road users and a history of following instructions output from infrastructure, and
wherein the real-time condition includes at least one of: an operating condition of the vehicle, an environment of the vehicle, a speed of the vehicle, an acceleration of the vehicle, an emotional state of a driver of the vehicle, and an autonomy mode of the vehicle.

9. A non-transitory computer-readable medium including instructions that when executed by one or more processors cause the one or more processors to:
acquire sensor data about a pedestrian and a vehicle in surroundings of a road crossing;
identify an intention to cross the road crossing of the pedestrian and a driving behavior of the vehicle, wherein the instructions to identify the driving behavior include instructions to identify the driving behavior based, at least in part, on at least one of: a driving history and a real-time condition of the vehicle;
determine a safety condition for the pedestrian to cross the road crossing based, at least in part, on the driving behavior; and
control at least one lighting mechanism of the road crossing according to the safety condition.

10. The non-transitory computer-readable medium of claim 9, wherein the instructions further include instructions to determine whether the safety condition satisfies a vehicle safety threshold, and wherein the safety condition satisfies the vehicle safety threshold when the vehicle is likely to stop before reaching the road crossing.

11. The non-transitory computer-readable medium of claim 9, wherein the instructions further include instructions to determine whether the safety condition satisfies a pedestrian safety threshold, wherein the safety condition satisfies the pedestrian safety threshold when a movement profile of the pedestrian allows the pedestrian to cross the road crossing without a path of the pedestrian and a path of the vehicle intersecting, and wherein the movement profile is based, at least in part, on at least one of a gait and a speed of the pedestrian.

12. The non-transitory computer-readable medium of claim 9, wherein the instructions to control the at least one lighting mechanism include instructions to cause a light associated with the road crossing that conveys the safety condition to activate when the safety condition indicates the driving behavior is safe.

13. The non-transitory computer-readable medium of claim 12, wherein the instructions to control the at least one lighting mechanism include instructions to control at least one of: a brightness, a color, and a flash pattern of the light, and wherein the light is at least one of: embedded into a surface of the road crossing and projected onto the surface of the road crossing.

14. A method, comprising:

acquiring sensor data about a pedestrian and a vehicle in surroundings of a road crossing;

identifying an intention to cross the road crossing by the pedestrian and a driving behavior of the vehicle, wherein identifying the driving behavior includes identifying the driving behavior based, at least in part, on at least one of: a driving history and a real-time condition of the vehicle;

determining a safety condition for the pedestrian to cross the road crossing based, at least in part, on the driving behavior; and controlling at least one lighting mechanism of the road crossing according to the safety condition.

15. The method of claim 14, further comprising: determining whether the safety condition satisfies a vehicle safety threshold, and wherein the safety condition satisfies the vehicle safety threshold when the vehicle is likely to stop before reaching the road crossing.

16. The method of claim 14, wherein identifying the intention of the pedestrian includes determining at least one of: a gait, a speed, an orientation, a behavior, and a location of the pedestrian.

17. The method of claim 14, further comprising: determining whether the safety condition satisfies a pedestrian safety threshold, wherein the safety condition satisfies the pedestrian safety threshold when a movement profile of the pedestrian allows the pedestrian to cross the road crossing without a path of the pedestrian and a path of the vehicle intersecting, and wherein the movement profile is based, at least in part, on at least one of a gait and a speed of the pedestrian.

18. The method of claim 14, wherein controlling the at least one lighting mechanism includes causing a light associated with the road crossing that conveys the safety condition to activate when the safety condition indicates the driving behavior is safe.

19. The method of claim 18, wherein controlling the at least one lighting mechanism includes controlling at least one of: a brightness, a color, and a flash pattern of the light, and wherein the light is at least one of: embedded into a surface of the road crossing and projected onto the surface of the road crossing.

20. The method of claim 14, wherein acquiring the sensor data about the vehicle includes acquiring at least one of: the driving history and the real-time condition of the vehicle, and wherein identifying the intention includes determining a direction of a gaze of the eyes of the pedestrian to assess whether the pedestrian intends to cross, and wherein identifying the driving behavior includes determining an autonomy level of the vehicle.

* * * * *